(12) United States Patent
Hughes

(10) Patent No.: US 11,064,326 B2
(45) Date of Patent: Jul. 13, 2021

(54) CREATING, JOINING, FINDING, DISCOVERING, RESTORING AND RELOCATING PROCESS-BASED CHANNELS

(71) Applicant: Nokia of America Corporation, Murray Hill, NJ (US)

(72) Inventor: Bryan K. Hughes, San Francisco, CA (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 14/504,996

(22) Filed: Oct. 2, 2014

(65) Prior Publication Data
US 2015/0098417 A1    Apr. 9, 2015

Related U.S. Application Data

(60) Provisional application No. 62/886,650, filed on Oct. 3, 2013.

(51) Int. Cl.
| | | |
|---|---|---|
| *H04W 72/12* | (2009.01) | |
| *H04W 4/60* | (2018.01) | |
| *H04W 12/06* | (2021.01) | |
| *H04W 4/50* | (2018.01) | |
| *H04L 29/06* | (2006.01) | |

(52) U.S. Cl.
CPC ............ *H04W 4/60* (2018.02); *H04W 4/50* (2018.02); *H04W 12/06* (2013.01); *H04L 63/083* (2013.01)

(58) Field of Classification Search
CPC ..... H04W 72/121; H04W 4/60; H04W 72/12; H04L 63/083
See application file for complete search history.

(56) References Cited

U.S. PATENT DOCUMENTS

| | | |
|---|---|---|
| 8,533,760 B1 | 9/2013 | Lakin et al. |
| 9,165,124 B1 | 10/2015 | Gurevich et al. |
| 2004/0225753 A1 | 11/2004 | Marriott et al. |
| 2005/0204042 A1 | 9/2005 | Banerjee et al. |
| 2006/0276196 A1 | 12/2006 | Jiang et al. |
| 2008/0109853 A1 | 5/2008 | Einarsson et al. |

(Continued)

FOREIGN PATENT DOCUMENTS

WO    WO-2014052869 A1    4/2014

OTHER PUBLICATIONS

International Search Report and Written Opinion issued for PCT/US2014/058827, dated Dec. 19, 2014, 14 pages.

(Continued)

*Primary Examiner* — Charles C Jiang
*Assistant Examiner* — Voster Preval
(74) *Attorney, Agent, or Firm* — Mintz Levin Cohn Ferris Glovsky and Popeo, P.C.

(57) ABSTRACT

A novel solution is disclosed whereby one or more mobile devices or web applications are able to create, join, find, discover, restore or relocate processed based channels for the purpose of creating a message bus for each attached device or application. A mobile or web application is allowed to open one or more channels as a message bus from one or more devices, which may include one or more other devices, to a node in a distributed cluster for the purpose of performing logic necessary for the function of the native application. Other objects, features, apparatus and methods are also disclosed.

26 Claims, 2 Drawing Sheets

(56) References Cited

U.S. PATENT DOCUMENTS

| | | | |
|---|---|---|---|
| 2009/0089781 A1 | 4/2009 | Shingai et al. | |
| 2010/0115566 A1 | 5/2010 | Haimi-Cohen | |
| 2011/0154305 A1 | 6/2011 | LeRoux et al. | |
| 2013/0212484 A1 | 8/2013 | Joshi et al. | |
| 2013/0262591 A1* | 10/2013 | Beslic | H04N 21/4788 709/206 |
| 2013/0262626 A1* | 10/2013 | Bozek | H04L 67/10 709/217 |
| 2013/0286959 A1* | 10/2013 | Lou | H04W 72/04 370/329 |
| 2013/0305357 A1* | 11/2013 | Ayyagari | G06F 9/00 726/22 |
| 2013/0322413 A1* | 12/2013 | Pelletier | H04W 72/1289 370/336 |
| 2013/0346513 A1 | 12/2013 | Jia et al. | |
| 2014/0003239 A1* | 1/2014 | Etemad | H04W 28/08 370/235 |
| 2014/0006502 A1* | 1/2014 | Gandhi | G06F 9/52 709/204 |
| 2014/0024341 A1* | 1/2014 | Johan | H04W 12/0608 455/411 |
| 2014/0086179 A1* | 3/2014 | Shi | H04L 5/0037 370/329 |
| 2014/0282928 A1* | 9/2014 | Morales | H04W 12/003 726/5 |
| 2015/0009279 A1* | 1/2015 | Vijayakumar | H04L 65/403 348/14.09 |
| 2015/0074743 A1* | 3/2015 | Ilieva | H04L 63/10 726/1 |
| 2015/0117373 A1* | 4/2015 | Thies | H04L 51/14 370/329 |
| 2015/0244777 A1 | 8/2015 | Hughes | |
| 2015/0373026 A1* | 12/2015 | Xu | H04L 63/083 726/4 |

OTHER PUBLICATIONS

International Search Report and Written Opinion issued for PCT/US2013/062365, dated Dec. 20, 2013, 5 pages.

* cited by examiner

CREATING, JOINING, FINDING, DISCOVERING, RESTORING AND RELOCATING PROCESS-BASED CHANNELS

CROSS REFERENCE TO RELATED APPLICATIONS

This application claims the benefit of U.S. Provisional Patent Application Ser. No. 61/886,650, filed Oct. 3, 2013, the entirety of which is herein incorporated by reference.

FIELD OF THE INVENTION

The present invention is in the technical field of distributed computing, as well as mobile and web services, or more specifically, methods and systems for distributed messaging via a channel architecture, process based services with multiple channel end points, and the feature of seamlessly moving a channel process between computer nodes anywhere in the world.

BACKGROUND OF THE INVENTION

This invention provides a solution to enable mobile devices as well as web applications with limited compute power the ability to execute complex functionality on considerably more powerful resources in the cloud, as if they were processed locally by the mobile or web application.

SUMMARY OF THE INVENTION

Considered broadly, the present invention discloses a novel solution whereby through a set of computational and programmatic electronic methods, one or more mobile devices or web applications are able to create, join, or find or discover processed based channels for the purpose of creating a message bus for each attached device or application. The present invention also discloses a novel solution whereby through a set of computational and programmatic electronic methods, a process-based channel can be dynamically restored or relocated to any node in a cluster regardless of geographic location. The invention allows for fault tolerance and high availability of a channel based messaging architecture. The invention allows a mobile or web application to open one or more channels as a message bus from one or more devices, which may include one or more other devices, to a node in a distributed cluster for the purpose of performing logic necessary for the function of the native application. Each channel is formally a process whose state is persisted to a distributed data store, and is able to be relocated or restored on-demand to any node in the cloud, regardless of physicality.

Other principal features and advantages of the invention will become apparent to those skilled in the art upon review of the following drawings, the detailed description, and the appended claims.

BRIEF DESCRIPTION OF THE DRAWINGS

Example embodiments will hereafter be described with reference to the accompanying drawings, wherein like numerals denote like elements. The drawings depict example embodiments in accordance with the disclosure and are, therefore, not to be considered limiting of its scope.

DETAILED DESCRIPTION

Figure 1:
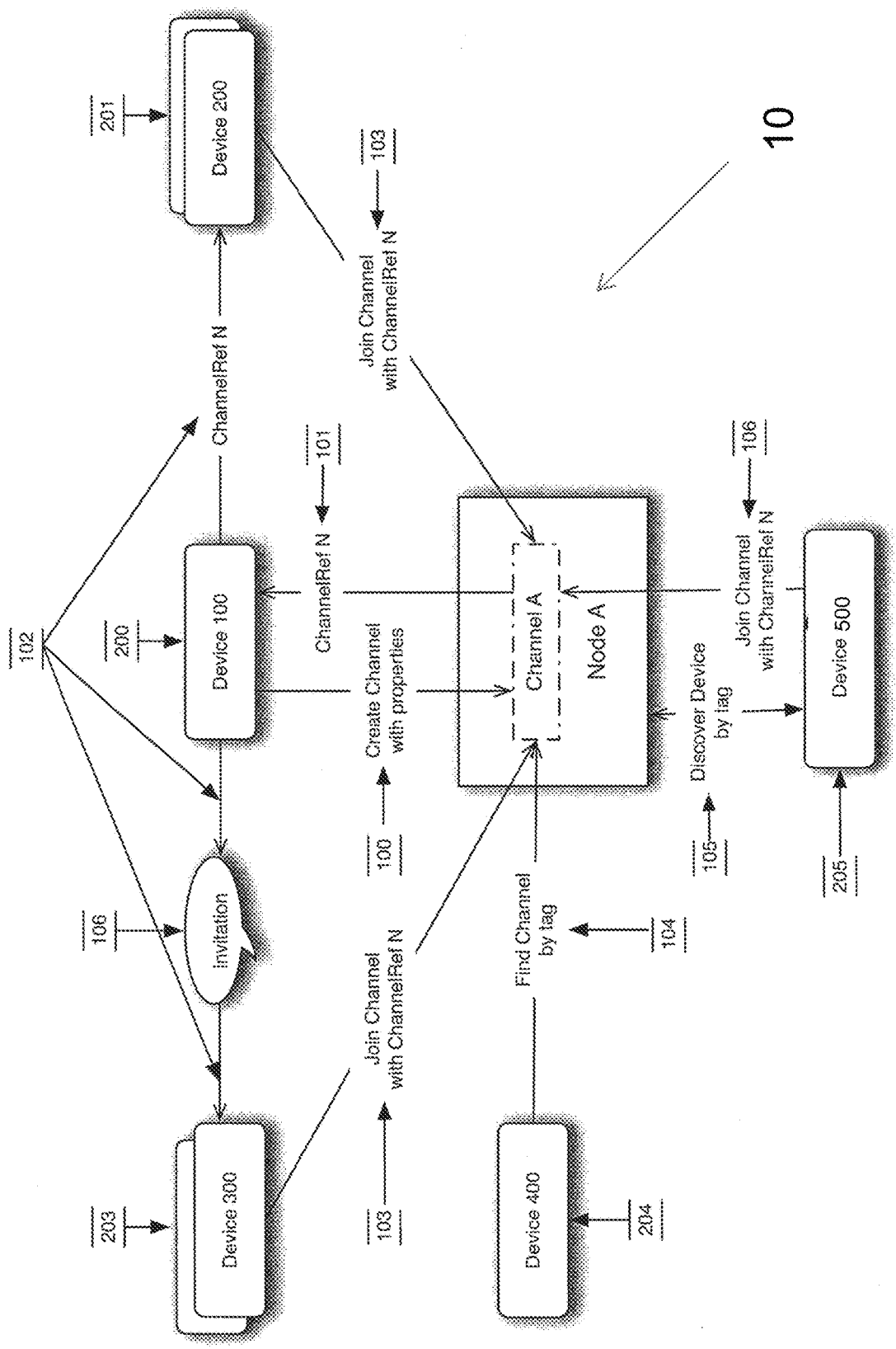
FIG. 1 is a high-level diagram of creating, joining, finding and discovering process-based channels.

Referring now to the drawings, FIG. 1 shows a distributed cluster 10 wherein any end-point broadly defined as any authenticated device, sensor, or computer system 200, can create a channel (such as Channel A of computer node A) based on a set of properties 100 such as lease-time, life-time, and persistence that will determine the nature of the channel. The lease-time determines how long the channel will remain alive and active since any activity that last occurred on the channel. If no activity has occurred and the lease-time expires, the channel is reaped by the system and moved into a historical read-only state that can only be replayed but never modified. The life-time determines the absolute life-time of the channel. Once the life-time has been reached, regardless of activity, the channel is reaped by the system and moved into a historical read-only state. Channels that are defined as persisted are recorded to a persisted data store while channels that do not have a persisted property are only transient in memory. The creation of a channel can also include the ability to label or tag the channel so that other devices in the system can find the channel. The channel can be given an optional password to provide security. If the channel is tagged with a password, then, preferably, the passwords must match before the system even acknowledges that the channel exists. Alternatively, if the channel is tagged with a password, then identifying data for the channel, or identifying data for devices joined to the channel, or identifying data for data accessible through the channel, are passed to the requesting device; however, the requesting device is not joined to the channel until the requesting device provides the appropriate password. When a channel is successfully created, the unique channel reference 101 to identify the channel is returned to the device 100 that requested creation of the channel.

Once a channel has been created, one or more other authenticated devices 200 (indicated as a group of devices 201) can join the channel either explicitly through use of the channel identifier, known also as a reference such as the unique channel reference 101 (seen to be ChannelRef N), or by an invitation process 106 which can include encoding a QR Code with a unique URL that allows any device with a QR Scanner to read the URL, redirect to the Go Machine distributed cluster 10, determine authentication, and join the channel. Other processes can be used to implement invitation process 106 including SMS, Email, NFC, Bluetooth, microwave, and sharing a well-formed URL via other technologies such as any 802.X network. Once one or more devices 300 in the group of devices 203 have accepted the invitation, they request to be joined to the channel via a join request 103 using the unique channel reference learned from the invitation process 106 and then they are allowed to join the channel. The unique channel reference shown here is, again, ChannelRef N.

Still referring to FIG. 1, devices such as the devices 400 in the group of devices 204 can find an existing channel by sending a find request 104 that includes a unique tag and optional password. If computer node A matches the unique tag (e.g. a unique channel reference such as ChannelRef N) and optional password contained in a find request 104 to the tag or unique channel reference (and password, if optionally used) of an existing channel, then all such devices 400 making the find request 104 are joined to the corresponding channel.

Devices such as the devices 500 in the group of devices 205 can discover an existing channel by sending a discover request 105 that includes one or more user or system defined device attributes. These attributes can be any arbitrary tag, identifier, set of tags or set of identifiers and can be matched against either, any or all of the corresponding attributes. If computer node A matches the device attributes contained in a discover request 105 to the device attributes for an existing channel, then computer node A communicates data identifying the match to all such devices 500 making the discover request 105. Devices 500 can then be joined to the channel through a join request 106.

A device 500 in the group of devices 205 may also attempt to discover other devices on the system by matching any or all tags, identifiers or other attributes published by a device. If other devices are found, computer node A will attempt to join them into a new or existing channel corresponding to such matched attributes. The discovery can either be active where each device is actively looking for other devices by tagged attributes, or passively where a form of notification can be pushed to the device that one or more other devices has an intention to create or join a channel.

In a preferred embodiment, the distributed cluster 10 includes a plurality of computer nodes, such as computer node A shown in FIG. 1. Such computer nodes in the distributed cluster preferably comprise a memory for storing the channel process. Such computer nodes also preferably control whether a join request from a device is allowed, and whether the device is subsequently joined to a channel for which the memory in the computer node stores the channel process. Such plurality of computer nodes and devices preferably form a network that can be any type of wireless public or private network including a cellular network, a local area network, or a wide area network such as the Internet, Such network may be comprised of sub-networks and consist of any number of devices.

It is seen from FIG. 1 and the related explanation that a method of operating a computer platform for providing a service to a mobile device is disclosed. The method includes providing a computer node and mobile device. A channel process is created with the mobile device, wherein the channel process is adapted to be executed on the computer node. The channel process is labeled with an identifier. A data store is in communication with the computer node and data is stored in the data store for use by the channel process in performing the service. A request is received for the service from the mobile device and the service is provided to the mobile device in response to the request. After a channel process is created or stored, a join request is received from the mobile device, wherein the join request includes the identifier. The mobile device is thereby joined to the channel process and the channel process provides the service to the mobile device. The identifier can include a unique tag and the responding step can join the mobile device to the channel process when the unique tag in the identifier provided by the mobile device matches the unique tag corresponding to the channel process. The identifier can include a password and the responding step can join the mobile device to the channel process only when both the unique tag and password in the identifier provided by the mobile device match the unique tag and password corresponding to the channel process. In some applications, the responding step does not identify the channel process to the mobile device until after both the unique tag and password in the identifier provided by the mobile device match the unique tag and password corresponding to the channel process. The service provided can include a chat, photo-graph sharing, voting, scheduling, video, push-to-talk or route management service. The service can also include any other service compatible with or needed via a mobile device. The systems for performing the above methods and method steps are also disclosed in FIG. 1 and the related explanation.

It is also seen from FIG. 1 and the related explanation that a method of operating a computer platform for providing a service to a mobile device is disclosed. The method includes providing a computer node and a channel process adapted to be executed on the computer node. The channel process is labeled with an identifier. A data store is in communication with the computer node and stores data used by the channel process in performing the service. A join request including the identifier is received from a first mobile device. The first mobile device is joined to the channel process in response to the join request. The channel process thus provides the service to the first mobile device. A second mobile device in communication with the first mobile device is also disclosed. The second mobile device originates an invitation to the first mobile device that includes the identifier. The channel process thus provides the service to the first mobile device. The identifier can include a unique tag and the responding step can join the mobile device to the channel process when the unique tag in the identifier provided by the mobile device matches the unique tag corresponding to the channel process. The identifier can include a password and the responding step can join the mobile device to the channel process only when both the unique tag and password in the identifier provided by the mobile device match the unique tag and password corresponding to the channel process. In some applications, the responding step does not identify the channel process to the mobile device until after both the unique tag and password in the identifier provided by the mobile device match the unique tag and password corresponding to the channel process. The service provided can include a chat, photograph sharing, voting, scheduling, video, push-to-talk or route management service. The service can also include any other service compatible with or needed via a mobile device. The systems for performing the above methods and method steps are also disclosed in FIG. 1 and the related explanation.

It is also seen from FIG. 1 and the related explanation that a method of operating a computer platform for providing a service to a mobile device is also disclosed. The method includes providing a computer node and a channel process adapted to be executed on the computer node. A data store is in communication with the computer node and stores data used by the channel process in performing the service. A discover request is received from a mobile device, wherein the discover request comprises attributes of a channel process. In response, a channel process executable by the computer node is identified wherein the identified channel process has attributes corresponding to the attributes in the discover request received from the mobile device. A join request is thereafter received from the mobile device for at least one identified channel process and the mobile device is joined to the at least one identified channel process. The corresponding service is thus provided to the mobile device. The service provided can include a chat, photograph sharing, voting, scheduling, video, push-to-talk or route management service. The service can also include any other service compatible with or needed via a mobile device. The systems for performing the above methods and method steps are also disclosed in FIG. 1 and the related explanation.

Figure 2:
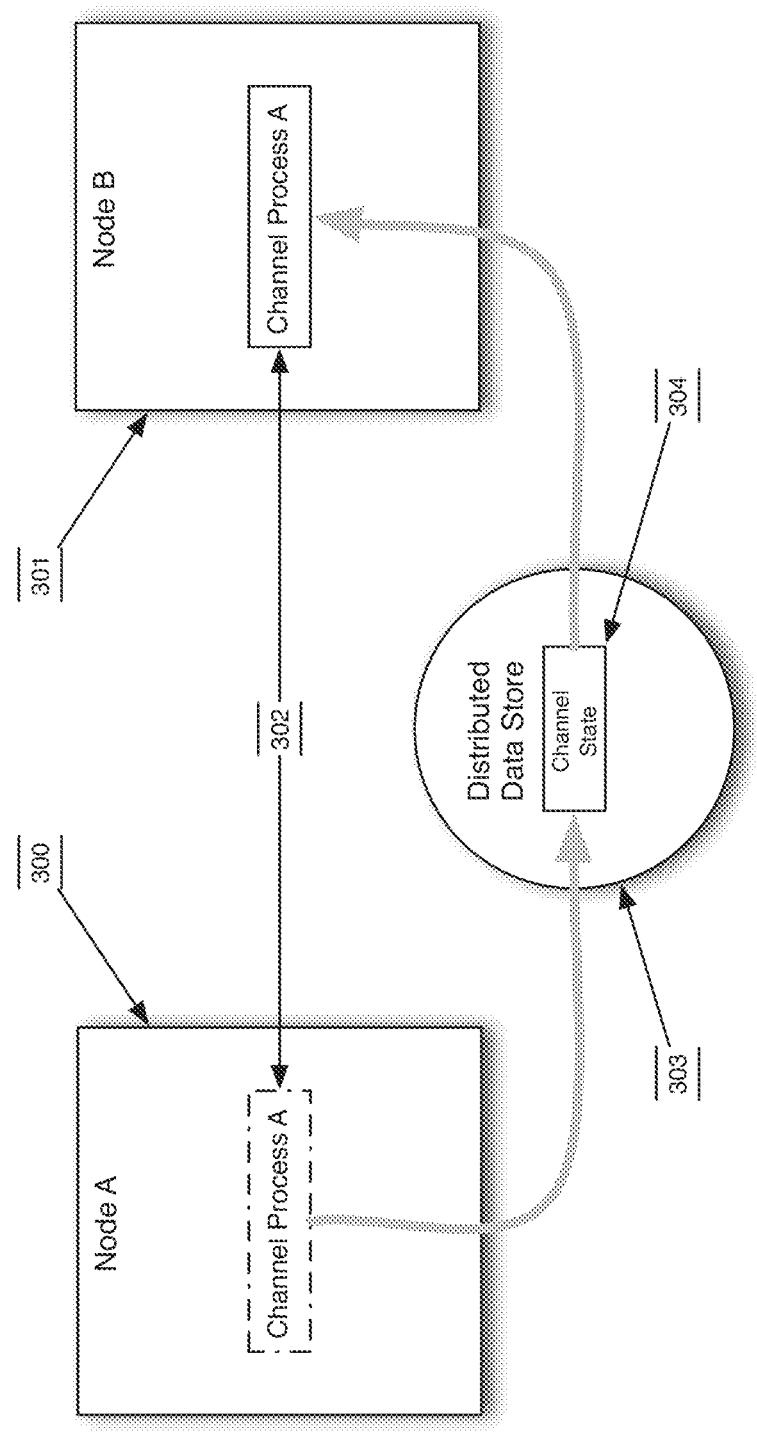
FIG. 2 is a high-level diagram of how a channel process is restored or relocated dynamically to any node in a cluster.

Turning now to FIG. 2, the dynamic restoration and relocation of a process based message queue is shown. FIG. 2 includes computer node A and computer node B. These computer nodes have a similar construction as computer node A in FIG. 1. They can communicate over a network line 302. When a process based channel that represents one or more message queues is created, it is initially assigned to an existing node A in the cluster. Unless otherwise affected, the channel process A will have an affinity to that node for the duration and lifetime of the channel.

When a computer node fails, any channels associated with the node will no longer be immediately present in the system. Upon the first request for any channel process no longer present, if none of the remaining nodes responds with ownership, the system is programmed to restore the requested channel to another available and accepting computer node in the cluster by reading back the last saved image and state 304 of the channel from the distributed persisted data store 303.

If the system detects that a computer node A, for example, in the cluster is becoming over loaded, the system is programmed to relocate the channel process A to another computer node B simply by killing the process during an idle moment and marking the computer node A as no longer accepting channels. During this condition, the next request to the channel process A will result in its instant restoration to the next available node B in the cluster. Thus, channel process A will be moved to computer node B by reading back the last saved image and state 304 of channel process A from the distributed persisted data store 303 and relocating it to node B.

If the system detects that the plurality of network activity is generated by devices that are distant geographically from the current nodes physical location, the system is programmed to relocate the channel process to a computer node in a cluster in a geographically nearby data center. In FIG. 2, for example, computer node A is geographically distant from the mobile devices whereas computer node B is nearby such devices. Accordingly, channel process A will be moved to computer node B by reading back the last saved image and state 304 of channel process A from the distributed persisted data store 303 and relocating it to node B.

When it is desired to restore a process based message queue, the same steps as described above are employed except that the channel process is restored to its initial computer node instead of being relocated to another computer node. In the example shown in FIG. 2, the channel process would be restored to computer node A (instead of being relocated to computer node B) by reading back the last saved image and state 304 of the channel from the distributed persisted data store 303 and storing it in computer node A.

It is seen from FIGS. 1, 2 and the related explanation that a method of operating a computer platform for providing a service to a mobile device is disclosed. The method includes providing a first computer node, a second computer node and a channel process adapted to be executed on the first computer node. The method also includes providing a distributed data store in communication with the first computer node and the second computer node, and storing data in the data store wherein the data is used by the channel process in performing the service for the mobile device. When a condition is detected with the first computer node, the channel process is relocated to the second computer node. The detected condition can include a failure of the first computer node, an overloading of the first computer node, or a detected geographic distance between the first computer node and the mobile device. The systems for performing the above methods and method steps are also disclosed in FIGS. 1, 2 and the related explanation.

It is seen from FIGS. 1, 2 and the related explanation that a method of operating a computer platform for providing a service to a mobile device is disclosed. The method includes providing a first computer node, a second computer node, and a channel process adapted to be executed on the first computer node and the second computer node. The method also includes a distributed data store in communication with the first computer node and the second computer node, and storing data in the data store wherein the data is used by the channel process in performing the service for the mobile device. When a condition with the first computer node is detected, the channel process is restored to the first computer node. The detected condition can include a failure of the first computer node, an overloading of the first computer node, or a detected geographic distance between the first computer node and the mobile device. The systems for performing the above methods and method steps are also disclosed in FIGS. 1, 2 and the related explanation.

The word "example" is used herein to mean serving as an example, instance, or illustration. Any aspect or design described herein as "example" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The example embodiments may be implemented as a method, apparatus, or article of manufacture using standard programming and/or engineering techniques to produce software, firmware, hardware, or any combination thereof to control a computer to implement the disclosed embodiments.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method comprising:
   creating a channel process with a mobile device, wherein a plurality of logical operations of the channel process are adapted to be executed on a first computer node;
   labeling the channel process with an identifier;
   defining a lease-time for the channel process to determine how long the channel process will remain active following a last activity performed by the channel process;
   storing state data in a data store in communication with the first computer node, wherein the state data is used by the channel process in performing a service;
   receiving a request for the service from the mobile device;
   providing the service to the mobile device in response to the request;
   detecting a condition at the first computer node;
   responding to the detected condition by relocating the channel process for execution of the plurality of logical operations on a second computer node;
   restoring, in response to the relocating, the state data from the data store to the channel process at the second computer node; and
   moving, in response to the lease-time expiring, the channel process to a read-only state in which the plurality of operations are replayed without being modified.

2. The method of claim 1, further comprising:
receiving a join request from the mobile device, wherein the join request comprises the identifier; and
responding to the join request by joining the mobile device to the channel process, wherein the channel process provides the service to the mobile device.

3. The method of claim 2, wherein the identifier comprises a unique tag, and wherein the responding further comprises joining the mobile device to the channel process when the unique tag in the identifier provided by the mobile device matches the unique tag corresponding to the channel process.

4. The method of claim 3, wherein the identifier further comprises a password, and wherein the responding further comprises joining the mobile device to the channel process in response to determining that both the unique tag and password in the identifier provided by the mobile device match the unique tag and password corresponding to the channel process.

5. The method of claim 3, wherein the identifier further comprises a password, and wherein the responding further comprises identifying the channel process to the mobile device in response to determining that both the unique tag and password in the identifier provided by the mobile device match the unique tag and password corresponding to the channel process.

6. The method of claim 1, wherein the service comprises a chat service, a photograph sharing service, a voting service, a scheduling service, a video service, a push-to-talk service, or a route management service.

7. The method of claim 1, wherein the detected condition comprises a failure of the first computer node.

8. The method of claim 1, wherein the detected condition comprises an overloading of the first computer node.

9. The method of claim 1, wherein the detected condition comprises a detected geographic distance between the first computer node and the mobile device.

10. A method comprising:
providing a channel process, wherein a plurality of logical operations of the channel process are adapted to be executed on a first computer node;
labeling the channel process with an identifier;
defining a lease-time for the channel process to determine how long the channel process will remain active following a last activity performed by the channel process;
storing state data in a data store in communication with the first computer node, wherein the state data is used by the channel process in performing a service;
receiving a join request from a first communication device, wherein the join request comprises the identifier;
responding to the join request by joining the first communication device to the channel process, wherein the channel process provides the service to the first communication device;
detecting a condition at the first computer node;
responding to the detected condition by relocating the channel process for execution of the plurality of logical operations on a second computer node;
restoring, in response to the relocating, the state data from the data store to the channel process at the second computer node; and
moving, in response to the lease-time expiring, the channel process to a read-only state in which the plurality of operations are replayed without being modified.

11. The method of claim 10, wherein the channel process further provides the service to a second communication device, wherein the join request is received from the first communication device in response to receiving, at the first communication device, an invitation from the second communication device, and wherein the invitation comprises the identifier.

12. The method of claim 10, wherein the identifier comprises a unique tag, and wherein the responding further comprises joining the first communication device to the channel process when the unique tag in the identifier provided by the first communication device matches the unique tag corresponding to the channel process.

13. The method of claim 12, wherein the identifier further comprises a password, and wherein the responding further comprises joining the first communication device to the channel process when both the unique tag and password in the identifier provided by the first communication device match the unique tag and password corresponding to the channel process.

14. The method of claim 12, wherein the identifier further comprises a password, and wherein the responding further comprises identifying the channel process to the first communication device in response to determining that both the unique tag and password in the identifier provided by the first communication device match the unique tag and password corresponding to the channel process.

15. The method of claim 10, wherein the service comprises a chat service, a photograph sharing service, a voting service, a scheduling service, a video service, a push-to-talk service, or a route management service.

16. The method of claim 10, wherein the detected condition comprises a failure of the first computer node or an overloading of the first computer node.

17. The method of claim 10, wherein the detected condition comprises a detected geographic distance between the first computer node and the first communication device.

18. A method comprising:
providing a channel process, wherein a plurality of logical operations of the channel process are adapted to be executed on a first computer node;
defining a lease-time for the channel process to determine how long the channel process will remain active following a last activity performed by the channel process;
storing state data in a data store in communication with the first computer node, wherein the state data is used by the channel process in performing a service;
receiving a discover request from a mobile device, wherein the discover request comprises attributes of a channel process;
responding to the discover request by identifying a channel process executable by the first computer node, wherein the identified channel process has attributes corresponding to the attributes in the discover request received from the mobile device;
receiving a join request from the mobile device for at least one identified channel process;
joining the mobile device to the at least one identified channel process, wherein each identified channel process provides the service to the mobile device;
detecting a condition at the first computer node;
responding to the detected condition by relocating the channel process to a second computer node for execution of the plurality of logical operations on the second computer node;
restoring, in response to the relocating, the state data from the data store to the channel process at the second computer node; and moving, in response to the lease-time expiring, the channel process to a read-only state in which the plurality of operations are replayed without being modified.

19. The method of claim 18, wherein the service comprises a chat service, a photograph sharing service, a voting service, a scheduling service, a video service, a push-to-talk service, or a route management service.

20. The method of claim 18, wherein the detected condition comprises a failure of the first computer node, an overloading of the first computer node, or a detected geographic distance between the first computer node and the mobile device.

21. An apparatus comprising:
at least one processor; and
at least one memory including instructions which, when executed by the at least one processor, cause the apparatus to at least:
create a channel process with a mobile device, wherein a plurality of logical operations of the channel process are adapted to be executed on the apparatus;
label the channel process with an identifier;
define a lease-time for the channel process to determine how long the channel process will remain active following a last activity performed by the channel process;
store state data in a data store in communication with the apparatus, wherein the state data is used by the channel process in performing a service;
receive a request for the service from the mobile device;
provide the service to the mobile device in response to the request;
detect a condition at the apparatus;
respond to the detected condition by relocating the channel process for execution of the plurality of logical operations on another apparatus;
restore, in response to the channel process being relocated, the state data from the data store to the channel process at the other apparatus; and
move, in response to the lease-time expiring, the channel process to a read-only state in which the plurality of operations are replayed without being modified.

22. The apparatus of claim 21, wherein the apparatus comprises or is comprised in a computer node and the other apparatus comprises or is comprised in another computer node.

23. An apparatus comprising:
at least one processor; and
at least one memory including instructions which, when executed by the at least one processor, cause the apparatus to at least:
provide a channel process, wherein a plurality of logical operations of the channel process are adapted to be executed on the apparatus;
label the channel process with an identifier;
define a lease-time for the channel process to determine how long the channel process will remain active following a last activity performed by the channel process;
store state data in a data store in communication with the apparatus, wherein the state data is used by the channel process in performing a service;
receive a join request from a first communication device, wherein the join request comprises the identifier;
respond to the join request by joining the first communication device to the channel process, wherein the channel process provides the service to the first communication device;
detect a condition at the apparatus;
respond to the detected condition by relocating the channel process for execution of the plurality of logical operations on another apparatus;
restore, in response to the channel process being relocated, the state data from the data store to the channel process at the other apparatus; and
move, in response to the lease-time expiring, the channel process to a read-only state in which the plurality of operations are replayed without being modified.

24. The apparatus of claim 23, wherein the apparatus comprises or is comprised in a computer node and the other apparatus comprises or is comprised in another computer node.

25. An apparatus comprising:
at least one processor; and
at least one memory including instructions which, when executed by the at least one processor, cause the apparatus to at least:
provide a channel process, wherein a plurality of logical operations of the channel process are adapted to be executed on the apparatus;
define a lease-time for the channel process to determine how long the channel process will remain active following a last activity performed by the channel process;
store state data in a data store in communication with the apparatus, wherein the state data is used by the channel process in performing a service;
receive a discover request from a mobile device, wherein the discover request comprises attributes of a channel process;
respond to the discover request by identifying a channel process executable by the apparatus, wherein the identified channel process has attributes corresponding to the attributes in the discover request received from the mobile device;
receive a join request from the mobile device for at least one identified channel process;
join the mobile device to the at least one identified channel process, wherein each identified channel process provides the service to the mobile device;
detect a condition at the apparatus;
respond to the detected condition by relocating the channel process to another apparatus for execution of the plurality of logical operations on the other apparatus;
restore, in response to the channel process being relocated, the state data from the data store to the channel process at the other apparatus; and
move, in response to the lease-time expiring, the channel process to a read-only state in which the plurality of operations are replayed without being modified.

26. The apparatus of claim 25, wherein the apparatus comprises or is comprised in a computer node and the other apparatus comprises or is comprised in another computer node.

* * * * *